(12) United States Patent
Schroeder

(10) Patent No.: US 12,241,679 B2
(45) Date of Patent: Mar. 4, 2025

(54) SYSTEMS AND METHODS FOR CAMERA SETTINGS ADJUSTMENTS IN REFRIGERATOR APPLIANCES

(71) Applicant: Haier US Appliance Solutions, Inc., Wilmington, DE (US)

(72) Inventor: Michael Goodman Schroeder, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 214 days.

(21) Appl. No.: 17/990,802

(22) Filed: Nov. 21, 2022

(65) Prior Publication Data

US 2024/0167759 A1 May 23, 2024

(51) Int. Cl.
*F25D 27/00* (2006.01)
*F25D 29/00* (2006.01)
*H04N 7/18* (2006.01)

(52) U.S. Cl.
CPC ........... *F25D 27/005* (2013.01); *H04N 7/188* (2013.01); *F25D 2700/122* (2013.01)

(58) Field of Classification Search
CPC ............................. F25D 27/005; H04N 7/188
See application file for complete search history.

(56) References Cited

U.S. PATENT DOCUMENTS

| 10,306,163 | B2 * | 5/2019 | Kim | H04N 23/741 |
| 2016/0201981 | A1 | 7/2016 | Kempfle et al. | |
| 2019/0098196 | A1 * | 3/2019 | Bessou | H04N 23/743 |
| 2020/0141634 | A1 * | 5/2020 | Cha | F25D 23/028 |
| 2022/0247934 | A1 * | 8/2022 | Walden, II | H01J 37/20 |

FOREIGN PATENT DOCUMENTS

| KR | 20210095527 A | 8/2021 |
| WO | WO2017072954 A1 | 5/2017 |

* cited by examiner

*Primary Examiner* — Jonathan Bradford
(74) *Attorney, Agent, or Firm* — Dority & Manning, P.A.

(57) ABSTRACT

A refrigerator appliance includes a cabinet defining a fresh food chamber and a freezer chamber and a plurality of camera assemblies mounted to the cabinet at a front portion of the fresh food chamber. The refrigerator appliance also includes a controller that is configured to perform a pixel statistical analysis of one or more video clips from the plurality of camera assemblies. The controller is configured to adjust one or both a brightness setting in the fresh food chamber of the refrigerator appliance and an exposure setting of the plurality of camera assemblies in response to the pixel statistical analysis of one or more video clips from the plurality of camera assemblies. The pixel statistical analysis of one or more video clips from the plurality of camera assemblies is triggered by an interaction with the refrigerator appliance.

18 Claims, 3 Drawing Sheets

SYSTEMS AND METHODS FOR CAMERA SETTINGS ADJUSTMENTS IN REFRIGERATOR APPLIANCES

FIELD OF THE INVENTION

The present subject matter relates generally to the adjustment of settings for cameras inside of refrigerator appliances.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Notably, it is frequently desirable to have an updated inventory of items that are present within the refrigerator appliance, e.g., to facilitate reorders, to ensure food freshness or avoid spoilage, etc. Thus, it may be desirable to monitor food items that are added to or removed from refrigerator appliance and obtain other information related to the presence, quantity, or quality of such food items. Certain conventional refrigerator appliances have systems for monitoring food items in the refrigerator appliance. However, such systems often require user interaction, e.g., via direct input through a control panel as to the food items added or removed. Other conventional refrigerator appliances include a camera for monitoring food items as the food items are added or removed from the refrigerator appliance. However, conventional camera systems may have difficulty identifying particular object or distinguishing between similar products within the chilled chamber.

BRIEF DESCRIPTION OF THE INVENTION

Aspects and advantages of the invention will be set forth in part in the following description, or may be apparent from the description, or may be learned through practice of the invention.

In one example embodiment, a refrigerator appliance includes a cabinet defining a fresh food chamber and a freezer chamber and a plurality of camera assemblies mounted to the cabinet at a front portion of the fresh food chamber. The refrigerator appliance also includes a controller that is configured to perform a pixel statistical analysis of one or more video clips from the plurality of camera assemblies. The controller is configured to adjust one or both a brightness setting in the fresh food chamber of the refrigerator appliance and an exposure setting of the plurality of camera assemblies in response to the pixel statistical analysis of one or more video clips from the plurality of camera assemblies. The pixel statistical analysis of one or more video clips from the plurality of camera assemblies is triggered by an interaction with the refrigerator appliance.

In another example embodiment, a method of operating a refrigerator appliance. The refrigerator appliance includes a cabinet defining a fresh food chamber and a freezer chamber, a plurality of camera assemblies mounted to the cabinet at a front portion of the fresh food chamber, and a controller configured to analyze one or more video clips from the plurality of camera assemblies. The method includes detecting, by the controller, a first half interaction at the refrigerator appliance and recording, by the plurality of camera assemblies, one or more video clips. The method further includes detecting, by the controller, a second half interaction at the refrigerator appliance and performing, by the controller, pixel statistical analysis of one or more video clips. Moreover, the method includes adjusting, by the controller, one or both a brightness setting and an exposure setting in the fresh food chamber of the refrigerator appliance of the plurality of camera assemblies.

In another example embodiment, a refrigerator appliance includes a cabinet defining a fresh food chamber and a freezer chamber and at least one camera assembly mounted to the cabinet at a front portion of the fresh food chamber; and the refrigerator appliance also includes a controller that is configured to perform a pixel statistical analysis of one or more video clips from the at least one camera assembly. The controller is configured to adjust one or both a brightness setting in the fresh food chamber of the refrigerator appliance and an exposure setting of the at least one camera assembly in response to the pixel statistical analysis of one or more video clips from the at least one camera assembly. The pixel statistical analysis of one or more video clips from the at least one camera assembly is triggered by a user interaction with the refrigerator appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
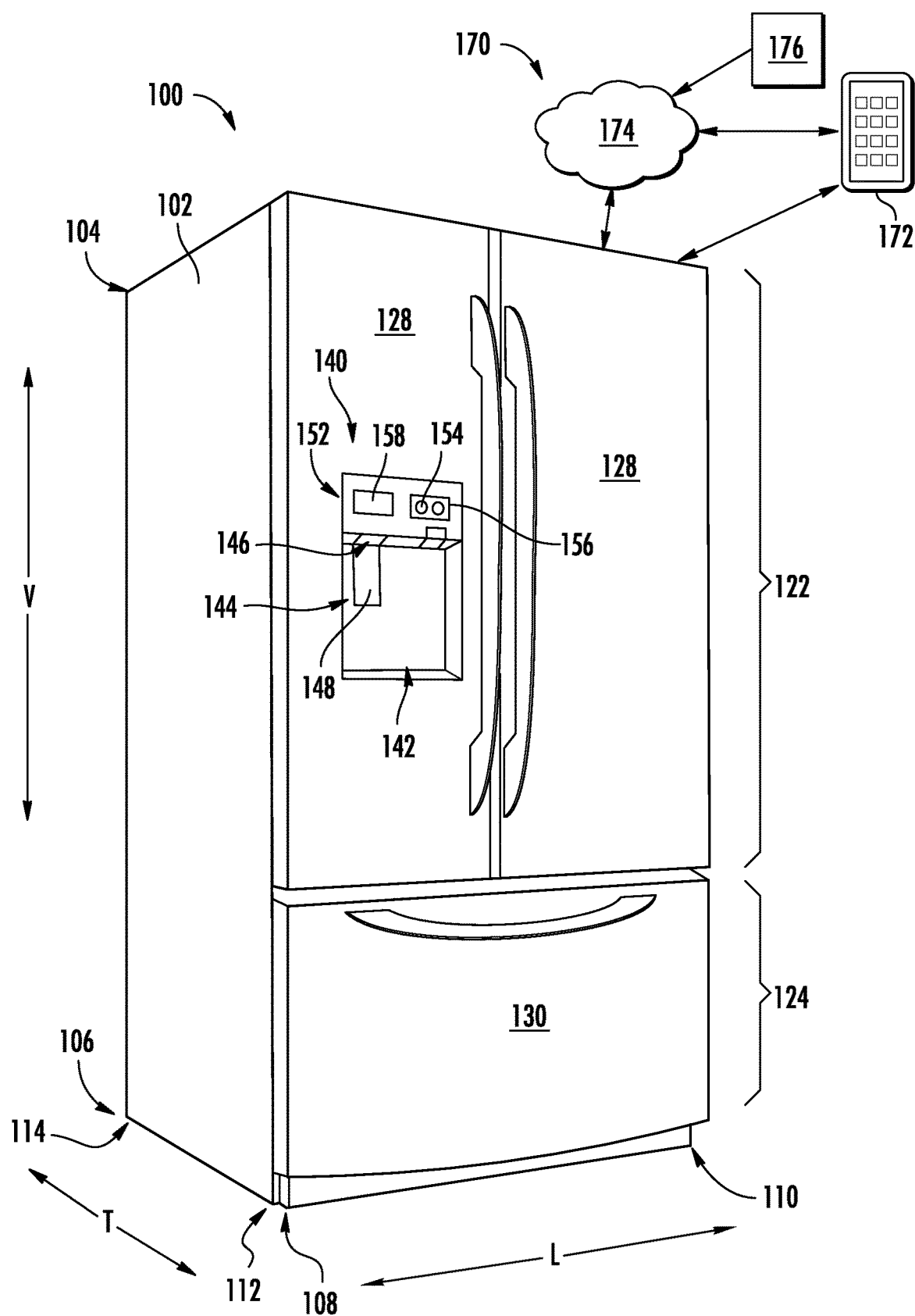
FIG. 1 is a perspective view of a refrigerator appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
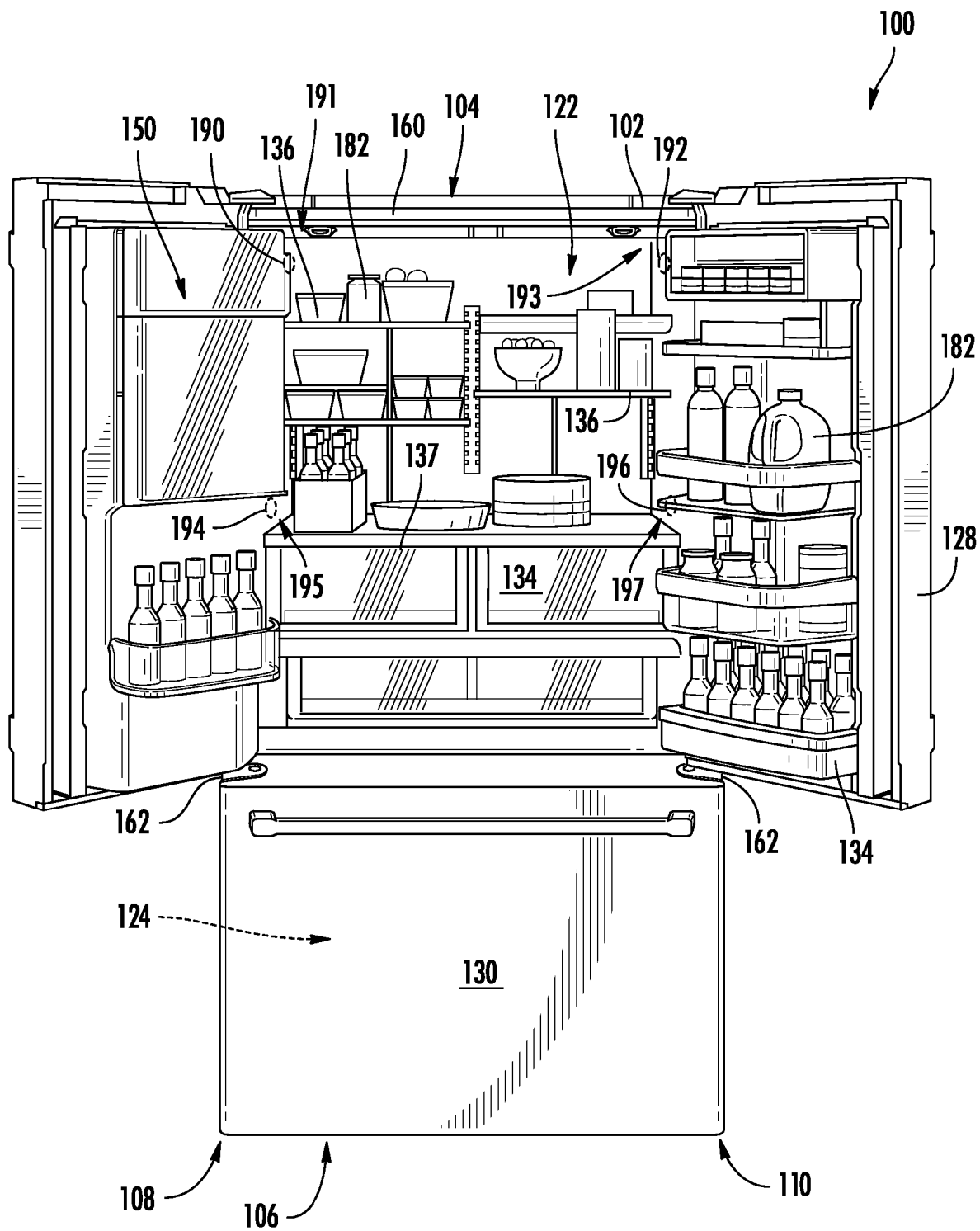
FIG. 2 is a perspective view of the example refrigerator appliance of FIG. 1, with the doors of the fresh food chamber shown in an open position.

Referring now to the figures, an example appliance will be described in accordance with aspects of the present subject matter. Specifically, FIG. 1 provides a perspective view of an example refrigerator appliance 100, and FIG. 2 illustrates refrigerator appliance 100 with some of the doors in the open position. As illustrated, refrigerator appliance 100 generally defines a vertical direction V, a lateral direction L, and a transverse direction T that are mutually perpendicular and form an orthogonal coordinate system.

According to example embodiments, refrigerator appliance 100 includes a cabinet 102 that is generally configured for containing and/or supporting various components of refrigerator appliance 100 and which may also define one or more internal chambers or compartments of refrigerator appliance 100. In this regard, as used herein, the terms "cabinet," "housing," and the like are generally intended to refer to an outer frame or support structure for refrigerator appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of refrigerator appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top portion 104 and a bottom portion 106 along the vertical direction V, between a first side portion 108 (e.g., the left side when viewed from the front as in FIG. 1) and a second side portion 110 (e.g., the right side when viewed from the front as in FIG. 1) along the lateral direction L, and between a front portion 112 and a rear portion 114 along the transverse direction T. In general, terms such as "left," "right," "front," "rear," "top," or "bottom" are used with reference to the perspective of a user accessing appliance 100. As shown in FIG. 2, cabinet 102 may include a top wall 160 and a pair of side walls 162, e.g., that are spaced apart along the lateral direction L.

Cabinet 102 defines chilled chambers for receipt of food items for storage. In particular, cabinet 102 defines fresh food chamber 122 positioned at or adjacent top portion 104 of cabinet 102 and a freezer chamber 124 arranged at or adjacent bottom portion 106 of cabinet 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well. Consequently, the description set forth herein is for illustrative purposes only and is not intended to be limiting in any aspect to any particular appliance or configuration.

Refrigerator doors 128 are rotatably hinged to an edge of cabinet 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. In general, refrigerator doors 128 form a seal over a front opening 132 defined by cabinet 102. In this regard, a user may place items within fresh food chamber 122 through front opening 132 when refrigerator doors 128 are open and may then close refrigerator doors 128 to facilitate climate control. Refrigerator doors 128 and freezer door 130 are shown in the closed configuration in FIG. 1. One skilled in the art will appreciate that other chamber and door configurations are possible and within the scope of the present invention.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Turning back to FIG. 1, a dispensing assembly 140 is generally configured for dispensing liquid water and/or ice. Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the example embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative example embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touch-screen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EE-PROM). Generally, the memory elements can store information accessible by a processing device, including instructions that can be executed by processing device. Optionally, the instructions can be software or any set of instructions and/or data that when executed by the processing device, cause the processing device to perform operations.

Referring still to FIG. 1, a schematic diagram of an external communication system 170 will be described according to an example embodiment of the present subject matter. In general, external communication system 170 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 170 may be used to transfer data or other information to improve performance of one or more external devices or appliances and/or improve user interaction with such devices.

For example, external communication system 170 permits controller 156 of refrigerator appliance 100 to communicate with a separate device external to refrigerator appliance 100, referred to generally herein as an external device 172. As described in more detail below, these communications may be facilitated using a wired or wireless connection, such as via a network 174. In general, external device 172 may be any suitable device separate from refrigerator appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with refrigerator appliance 100 and/or external device 172 through network 174. In this regard, for example, remote server 176 may be a cloud-based server 176, and is thus located at a distant location, such as in a separate city, state, country, etc. According to an example embodiment, external device 172 may communicate with a remote server 176 over network 174, such as the Internet, to transmit/receive data or information, provide user inputs, receive user notifications or instructions, interact with or control refrigerator appliance 100, etc. In addition, external device 172 and remote server 176 may communicate with refrigerator appliance 100 to communicate similar information. According to example embodiments, remote server 176 may be configured to receive and analyze images obtained by cameras 190, 192, 194, 196 of refrigerator appliance 100, e.g., to facilitate inventory analysis.

In general, communication between refrigerator appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with refrigerator appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an example embodiment of the present subject matter. However, it should be appreciated that the example functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now generally to FIG. 2, refrigerator appliance 100 may further include an inventory management system that is generally configured to monitor one or more chambers of refrigerator appliance 100 to monitor the addition or removal of inventory. More specifically, as described in more detail below, the inventory management system may include a plurality of sensors, cameras, or other detection devices that are used to monitor fresh food chamber 122 to detect objects (e.g., identified generally by reference numeral 182) that are positioned in or removed from fresh food chamber 122. In this regard, the inventory management system may use data from each of these devices to obtain a complete representation or knowledge of the identity, position, and/or other qualitative or quantitative characteristics of objects 182 within fresh food chamber 122. Although the inventory management system is described herein as monitoring fresh food chamber 122 for the detection of objects 182, it should be appreciated that aspects of the present subject matter may be used to monitor objects or items in any other suitable appliance, chamber, etc.

As shown schematically in FIG. 2, the inventory management system includes a plurality of camera assemblies that are generally positioned and configured for obtaining images of refrigerator appliance 100 during operation. Specifically, the inventory management system includes four cameras, namely, a first camera 190, a second camera 192, a third camera 194, and a fourth camera 196, that are mounted to cabinet 102 or are otherwise positioned in view of fresh food chamber 122. Although the four cameras 190, 192, 194, 196 are described herein as being used to monitor fresh food chamber 122 of refrigerator appliance 100, it should be appreciated that aspects of the present subject matter may be used to monitor any other suitable regions of any other suitable appliance, e.g., such as freezer chamber 124. In additional or alternative embodiments, refrigerator appliance 100 may include at least one camera assembly, such as one, two, three, four, or more camera assemblies.

As shown in FIG. 2, each of the four cameras 190, 192, 194, 196 is mounted to cabinet 102 at front opening 132 of fresh food chamber 122 and is oriented to have a field of view directed across front opening 132 and/or into fresh food chamber 122. The four cameras 190, 192, 194, 196 may be used to facilitate an inventory management process for refrigerator appliance 100. As such, the four cameras 190, 192, 194, 196 may be positioned at an opening to fresh food chamber 122 to monitor food items (identified generally as objects 182) that are being added to or removed from fresh food chamber 122. One or more (e.g., all) of the four cameras 190, 192, 194, 196 may also include a microphone for capturing audio.

As shown in FIG. 2, the four cameras 190, 192, 194, 196 may be mounted to cabinet 102 at a front portion of fresh food chamber 122, e.g., adjacent front opening 132 and/or front portion 112 of cabinet 102. For instance, fresh food chamber 122 may include a first corner 191, a second corner 193, a third corner 195, and a fourth corner 197. Thus, e.g., fresh food chamber 122 may have a rectangular cross-section, e.g., in a plane that is perpendicular to the transverse direction T. First camera 190 may be positioned at first corner 191, second camera 192 may be positioned at second corner 193, third camera 194 may be positioned at third corner 195, and fourth camera 196 may be positioned at fourth corner 197. First and second corners 191, 193 of fresh food chamber 122 may be positioned at a respective interface between top wall 160 and side walls 162 (e.g., where top wall 160 intersects each of side walls 162). Third and fourth corners 195, 197 may be positioned below first and second corners 191, 193, e.g., along the vertical direction V. For instance, third and fourth corners 195, 197 may be positioned at a respective interface between a bottommost shelf 137 in fresh food chamber 122 and sidewalls 162 (e.g., where the bottommost shelf 137 meets or is positioned at each of side walls 162). The bottommost shelf 137 may be positioned directly over bins 134 and/or formed by the top of bins 134. First and second cameras 190, 192 may be positioned above shelves 136 in fresh food chamber 122, and third and fourth 194, 196 may be positioned at bottommost shelf 137 in fresh food chamber 122.

First and second cameras 190, 192 may be positioned at a common vertical height within fresh food chamber 122. For example, first and second cameras 190, 192 may be positioned no more than eight centimeters from top wall 160. Third and fourth cameras 194, 196 may also be positioned at a common vertical height (e.g., different than that of the first and second cameras 190, 192) within fresh food chamber 122. For example, third and fourth cameras 194, 196 may be positioned no more than eight centimeters from bottommost shelf 137. First and third cameras 190, 194 may be positioned at a common lateral position within fresh food chamber 122. For example, first and third cameras 190, 194 may be positioned no more than eight centimeters from a first one of side walls 162. Second and fourth cameras 192, 196 may be positioned at a common lateral position (e.g., different than first and third cameras 190, 194) within fresh food chamber 122. For example, second and fourth cameras 192, 196 may be positioned no more than eight centimeters from a second one of side walls 162. As may be seen from the above, first camera 190 may be positioned proximate the top and first side portions of fresh food chamber 122, second camera 192 may be positioned proximate the top and second side portions of fresh food chamber 122, third camera 194 may be positioned proximate the bottom and first side portions of fresh food chamber 122, and fourth camera 196 may be positioned proximate the bottom and second side portions of fresh food chamber 122. In certain example embodiments, the four cameras 190, 192, 194, 196 may be positioned coplanar in a plane that is perpendicular to the transverse direction T.

It should be appreciated that the images obtained by the four cameras 190, 192, 194, 196 may vary in number, frequency, angle, resolution, detail, etc. in order to improve the clarity of the particular regions surrounding or within refrigerator appliance 100. In addition, according to example embodiments, controller 156 may be configured for illuminating the chilled chamber using one or more light sources prior to obtaining images. Notably, controller 156 of refrigerator appliance 100 (or any other suitable dedicated controller) may be communicatively coupled to camera assembly 190 and may be programmed or configured for analyzing the images obtained by camera assembly 190, as will be described below.

In general, controller 156 may be operably coupled to the four cameras 190, 192, 194, 196 for analyzing video clips, e.g., one or more images, obtained by the four cameras 190, 192, 194, 196 in order to adjust one or more camera settings to result in better quality. For example, controller 156 may be configured to adjust one or both of a brightness setting in fresh food chamber 122 of the refrigerator appliance 100 and an exposure setting of the four cameras 190, 192, 194, 196. The adjusting of the brightness setting and exposure setting may be in response to a pixel statistical analysis of one or more video clips from the four cameras 190, 192, 194, 196. The analysis of pixel statistics is an image analysis technique known in the art and description of the technique is omitted for the sake of brevity. The analysis of the video clips may be triggered by a user interaction with the refrigerator appliance 100. The interaction may include cycling doors 128 of refrigerator appliance between a closed position (FIG. 1) to an open position (FIG. 2), and to the closed position. Specifically, a first half user interaction may include moving doors 128 from the closed position to the open position, and a second half user interaction may include moving doors 128 from the open position to the closed position.

When doors 128 are in the open position, the four cameras 190, 192, 194, 196 may record video clips, and controller 156 may run the analysis on the video clips after the interaction is complete. In some example embodiments, the exposure setting and the lighting near each of the four cameras 190, 192, 194, 196 are held constant during the interaction. After analysis of the video clips is complete, if the overall brightness is one of below a lower threshold or above an upper threshold, the exposure setting may be either increased or decreased to compensate for subsequent interactions. For example, the lower threshold for brightness may be fifty lumens (50 lm) and the upper threshold for brightness may be one-thousand lumens (1000 lm). Additionally or alternatively, after analysis of the video clips is complete, lighting near each of the four cameras 190, 192, 194, 196 may be either increased or decreased in intensity in order to improve image quality for subsequent interactions. As such, each of the four cameras 190, 192, 194, 196 may have unique lighting (brightness) settings and exposure settings.

Figure 3:
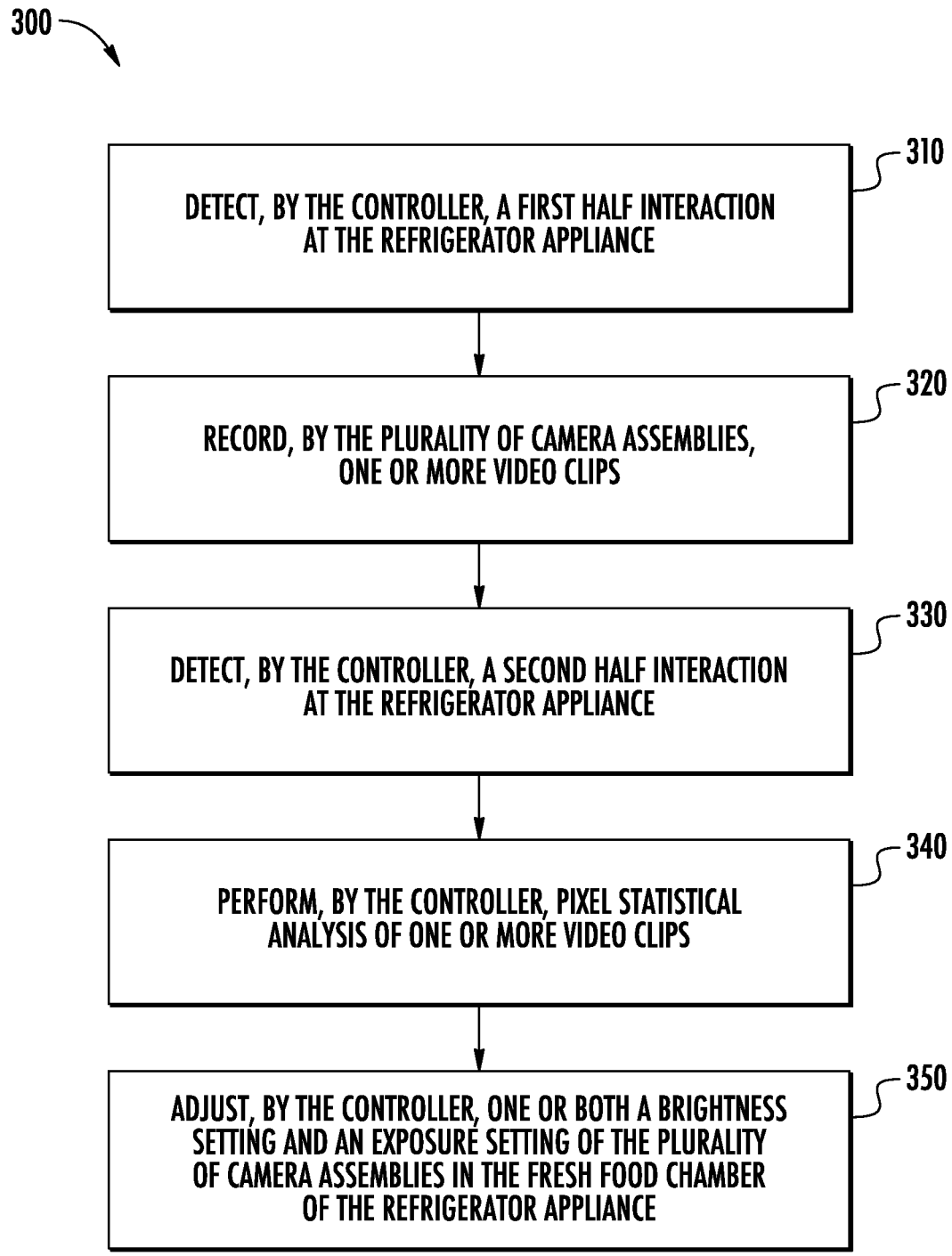
FIG. 3 is a method of operating the refrigerator appliance of FIG. 2 according to aspects of the present disclosure.

FIG. 3 provides a method 300 of operating refrigerator appliance 100. At 310, controller 156 may detect the first half interaction at refrigerator appliance 100. For example, controller 156 may detect that doors 128 have been moved from the closed position to the open position. At 320, the four cameras 190, 192, 194, 196 may record one or more video clips. For example, the four cameras 190, 192, 194, 196 may take a series of images of fresh food chamber 122. At 330, controller 156 may detect the second half interaction at refrigerator appliance 100. For example, controller 156 may detect that doors 128 have been moved from the open position to the closed position. At 340, while doors 128 are in the closed position, controller 156 may perform pixel statistical analysis of the video clips recorded at 320.

Specifically, after the interaction has concluded, pixel statistical analysis may be performed on the series of images that were taken from the four cameras 190, 192, 194, 196 while the doors 128 were in the open position. Then, at 350, controller 156 may adjust either one or both the brightness setting and the exposure setting of the four cameras 190, 192, 194, 196 in the fresh food chamber 122 of the refrigerator appliance 100. For example, in one scenario, if the brightness in fresh food chamber 122 is less than fifty lumens (50 lm), the exposure setting may be adjusted by controller 156 for subsequent interactions.

FIG. 3 depicts steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure. Moreover, although aspects of method 300 is explained using refrigerator appliance 100 as an example, it should be appreciated that method 300 may be applied to the operation of any suitable refrigerator appliance.

As may be seen from the above, refrigerator appliance 100 may include controller 156 which is configured to adjust exposure settings, e.g., exposure time, and other settings after each interaction. During interactions, e.g., opening and closing doors 128 of refrigerator appliance 100, the brightness setting and the exposure setting of the four cameras 190, 192, 194, 196 may remain constant such that the four cameras 190, 192, 194, 196 may record video clips, e.g., series of images, during the interactions. Once the interaction is concluded, controller 156 may adjust exposure settings and other settings in order to produce high quality video/images.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
   a cabinet defining a fresh food chamber and a freezer chamber;
   a plurality of camera assemblies mounted to the cabinet at a front portion of the fresh food chamber; and
   a controller configured to perform a pixel statistical analysis of one or more video clips from the plurality of camera assemblies,
   wherein the controller is configured to adjust one or both a brightness setting in the fresh food chamber of the refrigerator appliance and an exposure setting of the plurality of camera assemblies in response to the pixel statistical analysis of one or more video clips from the plurality of camera assemblies, and
   wherein the pixel statistical analysis of one or more video clips from the plurality of camera assemblies is triggered by a user interaction with the refrigerator appliance,
   wherein the user interaction comprises a cycle of a door of the refrigerator appliance, the cycle comprising the door moving between a closed position to an open position, and back to the closed position.

2. The refrigerator appliance of claim 1, wherein when the door is in the open position, the plurality of camera assemblies records a video clip.

3. The refrigerator appliance of claim 2, wherein the pixel statistical analysis is performed after the user interaction is complete.

4. The refrigerator appliance of claim 3, wherein the exposure setting is held constant during the user interaction.

5. The refrigerator appliance of claim 4, wherein, after the pixel statistical analysis when overall brightness is one of below a lower threshold or above an upper threshold, the exposure setting is one of increased or decreased to compensate for subsequent user interaction.

6. The refrigerator appliance of claim 3, wherein lighting near each camera of the plurality of camera assemblies is held constant during the user interaction.

7. The refrigerator appliance of claim 5, wherein, after the pixel statistical analysis, lighting near each camera of the plurality of camera assemblies is one of increased or decreased in intensity in order to improve image quality for subsequent user interaction.

8. The refrigerator appliance of claim 1, wherein each camera of the plurality of camera assemblies has a respective lighting setting and exposure setting.

9. A method of operating a refrigerator appliance, the refrigerator appliance comprising a cabinet defining a fresh food chamber and a freezer chamber, a plurality of camera assemblies mounted to the cabinet at a front portion of the fresh food chamber, and a controller configured to analyze one or more video clips from the plurality of camera assemblies, the method comprising:

- detecting, by the controller, a first half user interaction at the refrigerator appliance;
- recording, by the plurality of camera assemblies, one or more video clips;
- detecting, by the controller, a second half user interaction at the refrigerator appliance;
- performing, by the controller, pixel statistical analysis of one or more video clips; and
- adjusting, by the controller, one or both a brightness setting and an exposure setting of the plurality of camera assemblies in the fresh food chamber of the refrigerator appliance,
- wherein together the first user interaction and the second user interaction comprises a cycle of a door of the refrigerator appliance, the cycle comprising the door moving between a closed position to an open position, and back to the closed position.

10. The method of claim 9, wherein the first half user interaction comprises the door of the refrigerator appliance moving from the closed position to the open position, and wherein the second half user interaction comprises the door moving from the open position to the closed position.

11. The method of claim 10, wherein when the door is in the open position, the plurality of camera assemblies records a video clip.

12. The method of claim 11, wherein pixel statistical analysis is run after conclusion of both the first half user interaction and the second half user interaction.

13. The method of claim 12, wherein the exposure setting is held constant during both the first half user interaction and the second half user interaction.

14. The method of claim 13, wherein after the pixel statistical analysis, when overall brightness is one of below a lower threshold or above an upper threshold, the exposure setting is one of increased or decreased to compensate for subsequent user interaction.

15. The method of claim 12, wherein lighting near each camera of the plurality of camera assemblies is held constant during both the first half user interaction and the second half user interaction.

16. The method of claim 15, wherein after analysis, lighting near each camera of the plurality of camera assemblies is one of increased or decreased in intensity in order to improve image quality for subsequent user interaction.

17. The method of claim 9, wherein each of camera of the plurality of camera assemblies has a respective brightness setting and exposure setting.

18. A refrigerator appliance, comprising:

- a cabinet defining a fresh food chamber and a freezer chamber;
- at least one camera assembly mounted to the cabinet at a front portion of the fresh food chamber; and
- a controller configured to perform a pixel statistical analysis of one or more video clips from the at least one camera assembly,
- wherein the controller is configured to adjust one or both a brightness setting in the fresh food chamber of the refrigerator appliance and an exposure setting of the at least one camera assembly in response to the pixel statistical analysis of one or more video clips from the at least one camera assembly, and
- wherein the pixel statistical analysis of one or more video clips from the at least one camera assembly is triggered by a user interaction with the refrigerator appliance,
- wherein the user interaction comprises a cycle of a door of the refrigerator appliance, the cycle comprising the door moving between a closed position to an open position, and back to the closed position.

* * * * *